United States Patent
Fiveash et al.

(10) Patent No.: US 6,717,591 B1
(45) Date of Patent: Apr. 6, 2004

(54) COMPUTER DISPLAY SYSTEM FOR DYNAMICALLY CONTROLLING THE PACING OF SEQUENTIAL PRESENTATION SEGMENTS IN RESPONSE TO USER VARIATIONS IN THE TIME ALLOCATED TO SPECIFIC PRESENTATION SEGMENTS

(75) Inventors: William Alton Fiveash, Austin, TX (US); Denise Marie Genty, Austin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 09/652,052

(22) Filed: Aug. 31, 2000

(51) Int. Cl.[7] .................................................. G09G 5/00
(52) U.S. Cl. ...................................... 345/732; 345/723
(58) Field of Search ................................. 345/730, 731, 345/732, 723, 726

(56) References Cited

U.S. PATENT DOCUMENTS 5,035,624 A * 7/1991 Hosoya et al. .............. 434/309
5,574,798 A * 11/1996 Greer et al. ................. 382/100
6,108,001 A * 8/2000 Tuttle ......................... 345/730

OTHER PUBLICATIONS

Bott, Ed. "Using Microsoft Office 2000". Que Publishing, 1999: p. 514.*

* cited by examiner

Primary Examiner—John Cabeca
Assistant Examiner—Brian Detwiler
(74) Attorney, Agent, or Firm—Diana Roberts; Volel Emile; Jerry Kraft

(57) ABSTRACT

For a presentation comprising a plurality of presentation segments, timing is established through the combination of assigning a portion of a total presentation time to each of the plurality of presentation segments, displaying the time assigned to each of said presentation segments, enabling a user to change the time assigned to the segment being presented, and in response to a change in said time, dynamically reapportioning the remaining total time among the subsequent sequential presentation segments. The reapportioned times for said subsequent sequential presentation segments can further be displayed. There may also be means, responsive to the change in the time, for dynamically eliminating one of said sequential segments. In slide presentations, there may be means for displaying the reapportioned times for said subsequent sequential individual slides together with miniaturizations of each of said subsequent sequential individual slides.

21 Claims, 8 Drawing Sheets

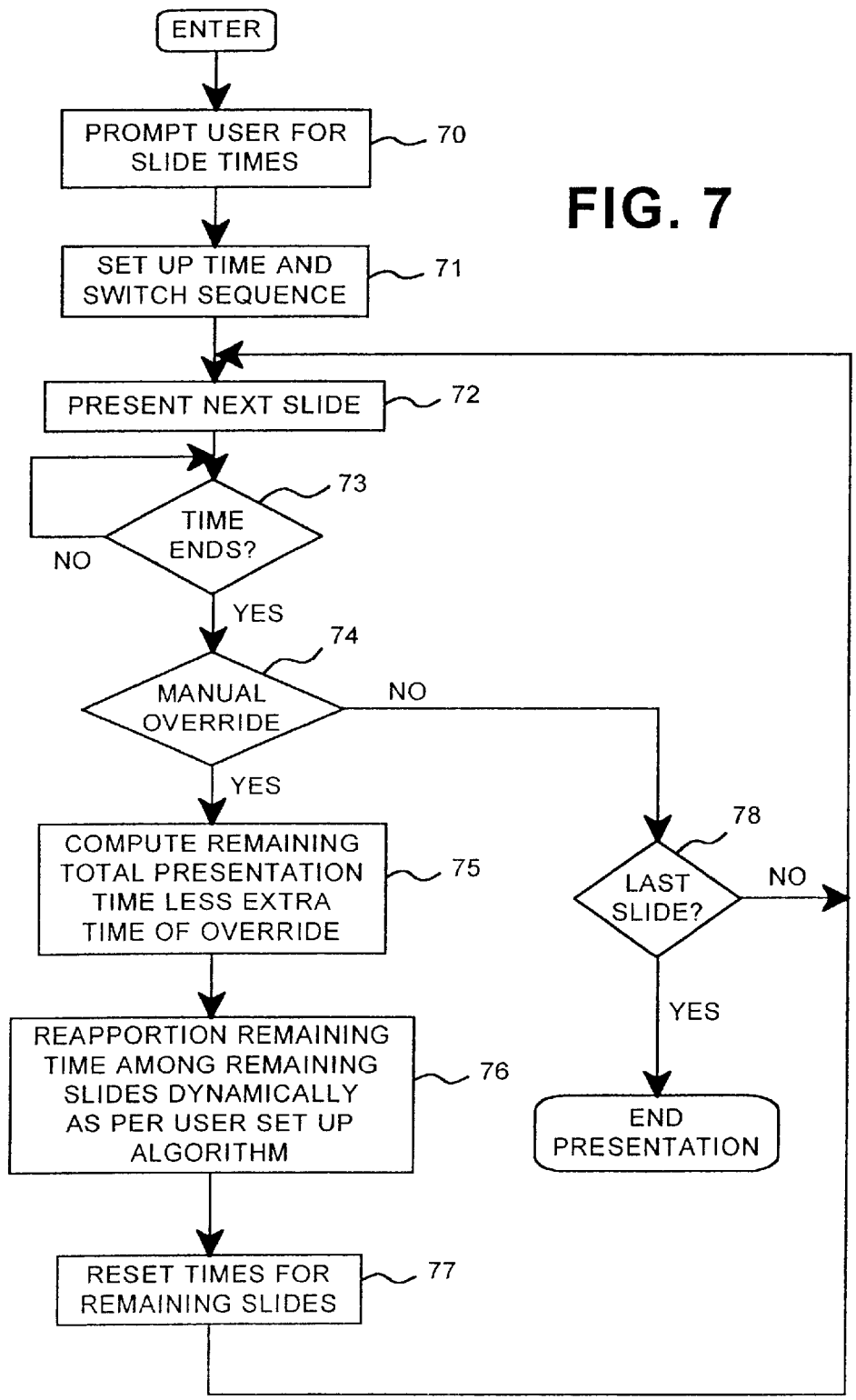

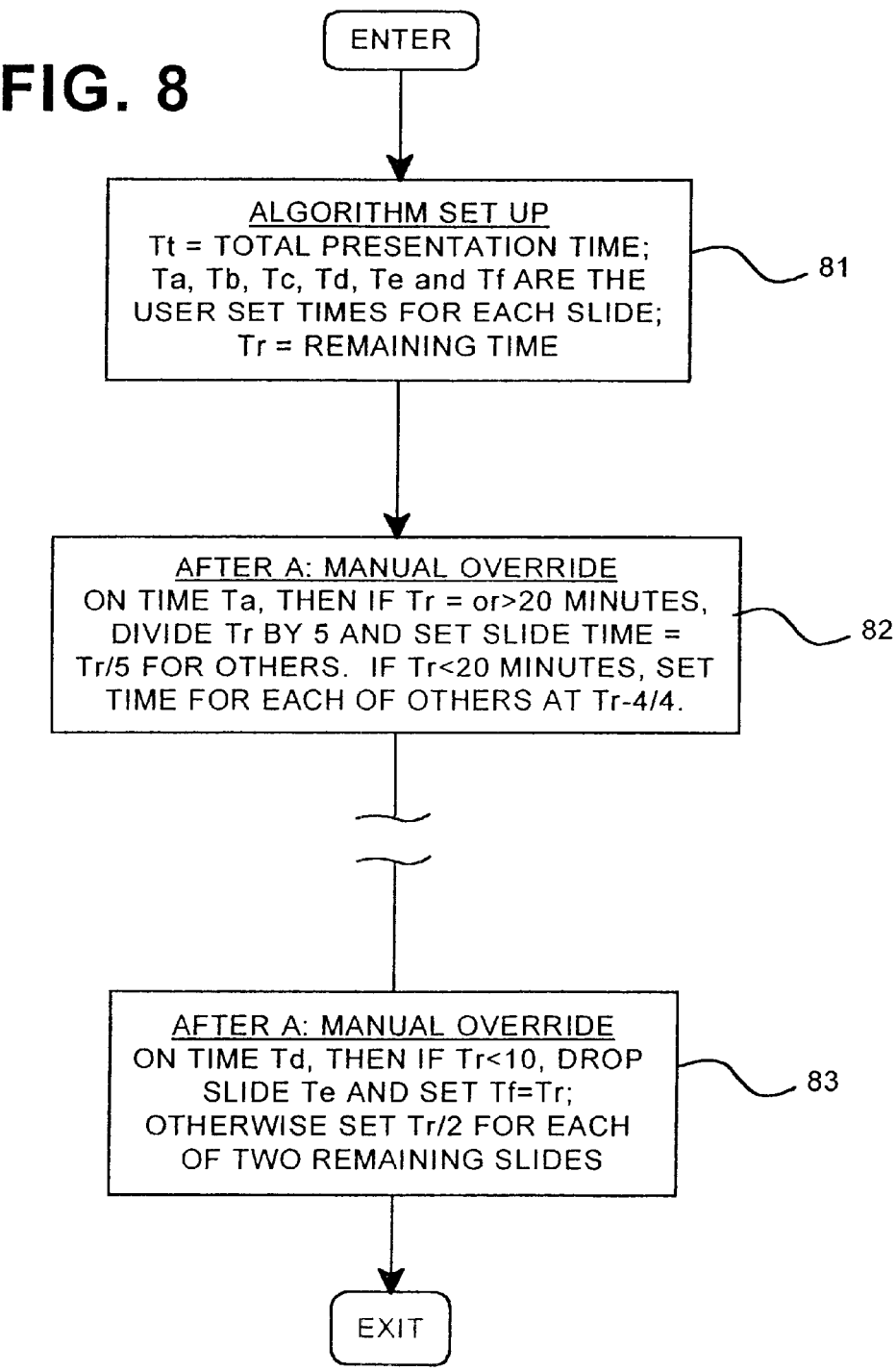

COMPUTER DISPLAY SYSTEM FOR DYNAMICALLY CONTROLLING THE PACING OF SEQUENTIAL PRESENTATION SEGMENTS IN RESPONSE TO USER VARIATIONS IN THE TIME ALLOCATED TO SPECIFIC PRESENTATION SEGMENTS

TECHNICAL FIELD

The present invention relates to user interactive computer supported display technology and particularly to display systems for controlling the timing of presentations comprised of a sequence of presentation segments.

BACKGROUND OF RELATED ART

The past decade has been marked by a technological revolution driven by the convergence of the data processing industry with the consumer electronics industry. As a result of these changes, it seems as if virtually all aspects of human endeavor in the industrialized world requires human-computer interfaces. There is a need to make computer directed activities accessible to many people who were, until recently, computer indifferent. There are great numbers of potential users highly skilled in a variety of technological, business and educational fields who use computers only to the extent absolutely necessary. Thus, they use computers for word processing and Internet access but are resistant to other significant functions. These users are resistant because they consider the other computer controlled functions not user friendly, i.e. the applications are not intuitive or dynamic. The functions require an initial investment of time in the learning curve and must be continually used or they will be easily forgotten. Computer controlled or computer aided presentations is one such category of computer functions. These applications, such as Powerpoint™, discussed in great detail in the text, Using Microsoft™ Powerpoint™97, by N. Stevenson et al., published by Que, Indianapolis, Ind., 1997, have provided excellent presentation tools to teachers and academic lecturers who regularly make such presentations. On the other hand, other potential users in the business and technological field who make presentations less frequently have shown a resistance to such presentation applications because of a real or perceived impression that the applications are not intuitive or dynamic enough for the casual or less regular user.

SUMMARY OF THE PRESENT INVENTION

The present invention provides an implementation which makes the giving of computer controlled or computer aided presentations more intuitive and dynamic, even to the casual user. The implementation is directed to the pacing of presentations made up of a plurality of presentation segments and comprises the combination of means for assigning a portion of a total presentation time for each of said plurality of presentation segments; means for displaying the time assigned to each of said presentation segments; means enabling an interactive user to change, during the presentation of a segment, the time assigned to the segment being presented; and means responsive to a change in said time assigned to a sequential segment for dynamically reapportioning remaining total time among the subsequent sequential presentation segments.

The invention preferably also includes means for displaying the reapportioned times for said subsequent sequential presentation segments. There may also be means, responsive to the change in the time, for dynamically eliminating one of said sequential segments.

According to one aspect of the present invention, each of said presentation segments is a presentation of an individual slide. This aspect also may include the means responsive to the change in the time for dynamically eliminating one of said sequential slides.

In slide presentations, there may be means for displaying the reapportioned times for the subsequent sequential individual slides including means for displaying a screen including miniaturizations of each of the subsequent sequential individual slides together with means for the displaying of the reapportioned time for each slide adjacent to each slide.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 7 is a flowchart of an illustrative run of a program set up in accordance with the flowchart of FIG. 6; and FIG. 8 is the flowchart of an algorithm for dynamically recalculating remaining times for each remaining slide time after a manual override has been done.

DETAILED DESCRIPTION OF THE PREFERRED EMBODIMENT

Figure 1:
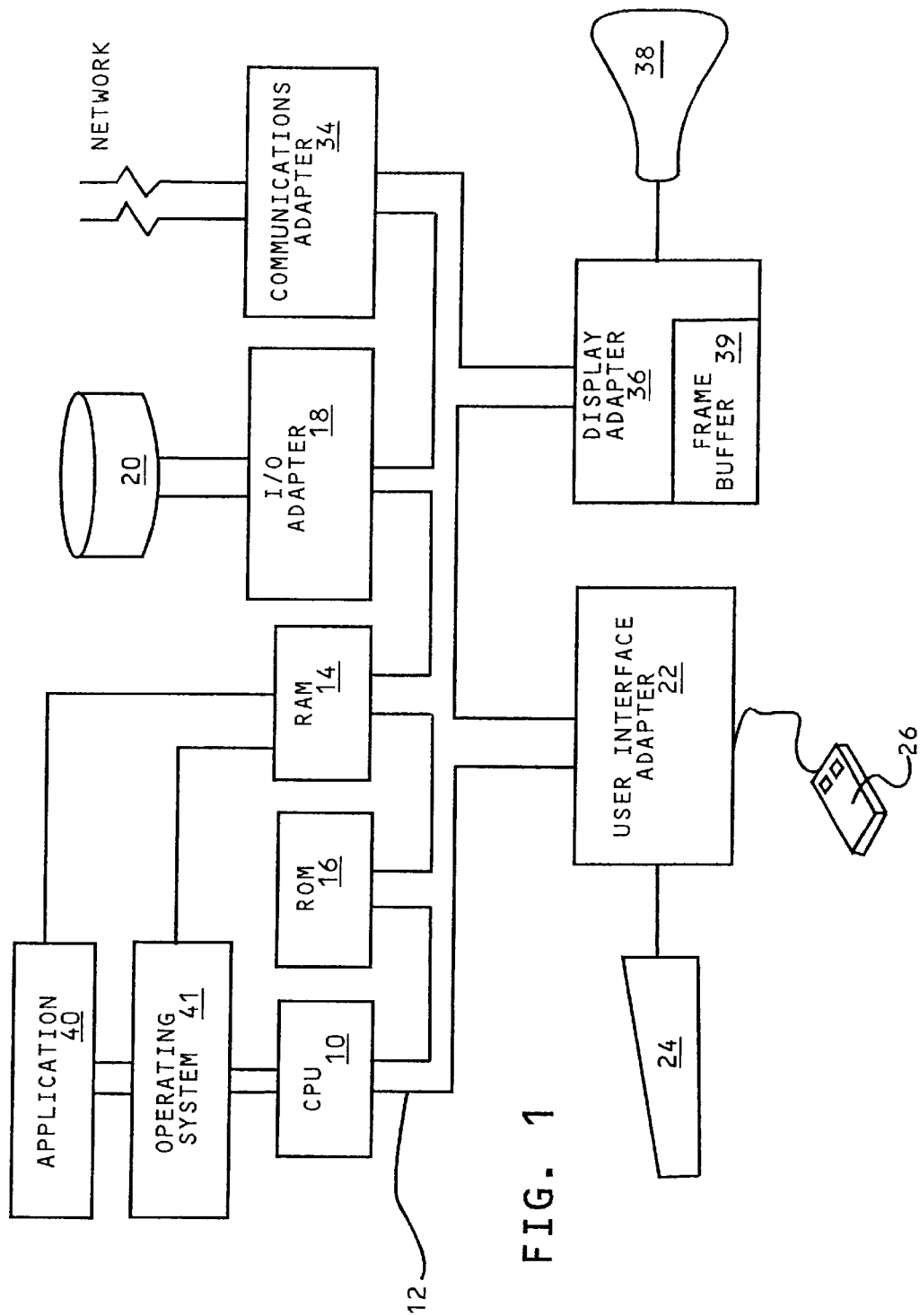
FIG. 1 is a block diagram of an interactive data processor controlled display system including a central processing unit which is capable of dynamically reapportioning remaining total time among the subsequent sequential presentation segments in response to a change in said time assigned to a sequential segment.

Referring to FIG. 1, a typical data processing system is shown which may function as the computer controlled display terminal used in controlling the presentation of the instant invention. A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows 98™ or Windows NT™, as well as UNIX and AIX operating systems. Application program 40, controlled by the system, are moved into and out of the main memory Random Access Memory (RAM) 14. These programs include the programs of the present invention for controlling the timing of presentations by dynamically reapportioning remaining total time among subsequent presentation segments after a manual user change to the designated time allocated to a prior presentation segment. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with an outside network enabling the data processing system to communicate with other systems. Such networked systems include a Local Area Network (LAN) or a Wide Area Network (WAN), which includes, of course, the World Wide Web (Web) or Internet. The present invention is applicable to remote presentations made to locations remote from the presenter using such communication networks. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24, particularly for text, or mouse 26 and receiving output information from the system via display 38 and set up in frame buffer 39. In the description which follows of the slide presentation embodiment, the user interactively controls via display screens on display 38, and a slide projector may be stepped through a slide stepping mechanism connected via user interface adapter 22.

There will now be described a simple illustration of the present invention with respect to the display screens of FIGS. 2 through 5. When the screen images are described, it will be understood that these may be rendered by storing image and text creation programs, such as those in any conventional window operating system in the RAM 14 of the system of FIG. 1. The operating system is diagrammatically shown in FIG. 1 as operating system 41. The display screens of FIGS. 2 through 5 are presented to the viewer on display monitor 38 of FIG. 1. In accordance with, conventional techniques, the user may control the screen interactively through a conventional I/O device, such as mouse 26 of FIG. 1.

Figure 2:
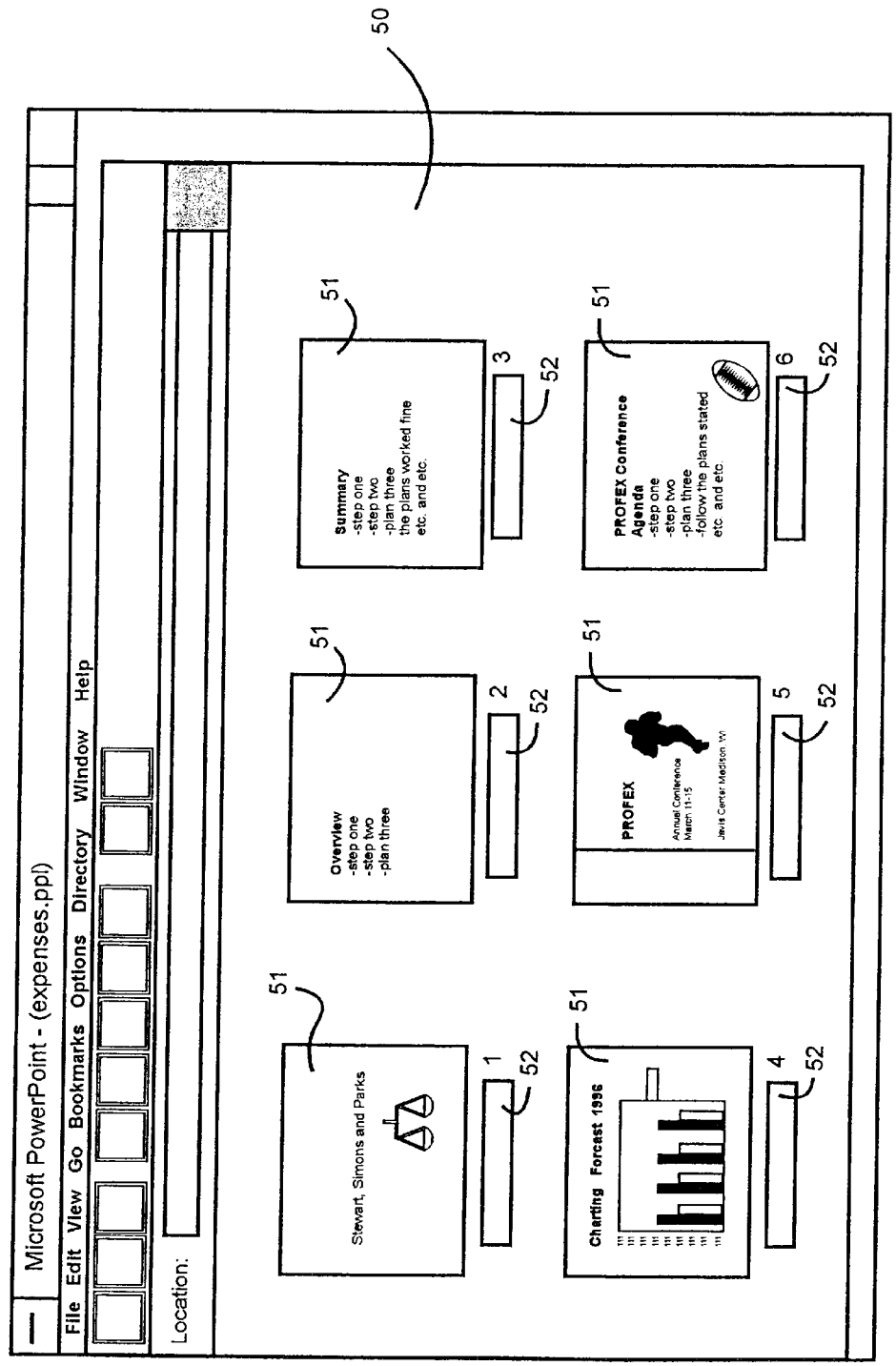
FIG. 2 is a diagrammatic view of a display screen with miniaturized versions of a sequence of slides to be presented with dialog entry fields below each slide prompting a user entry of the presentation time assigned to each slide.
Figure 3:
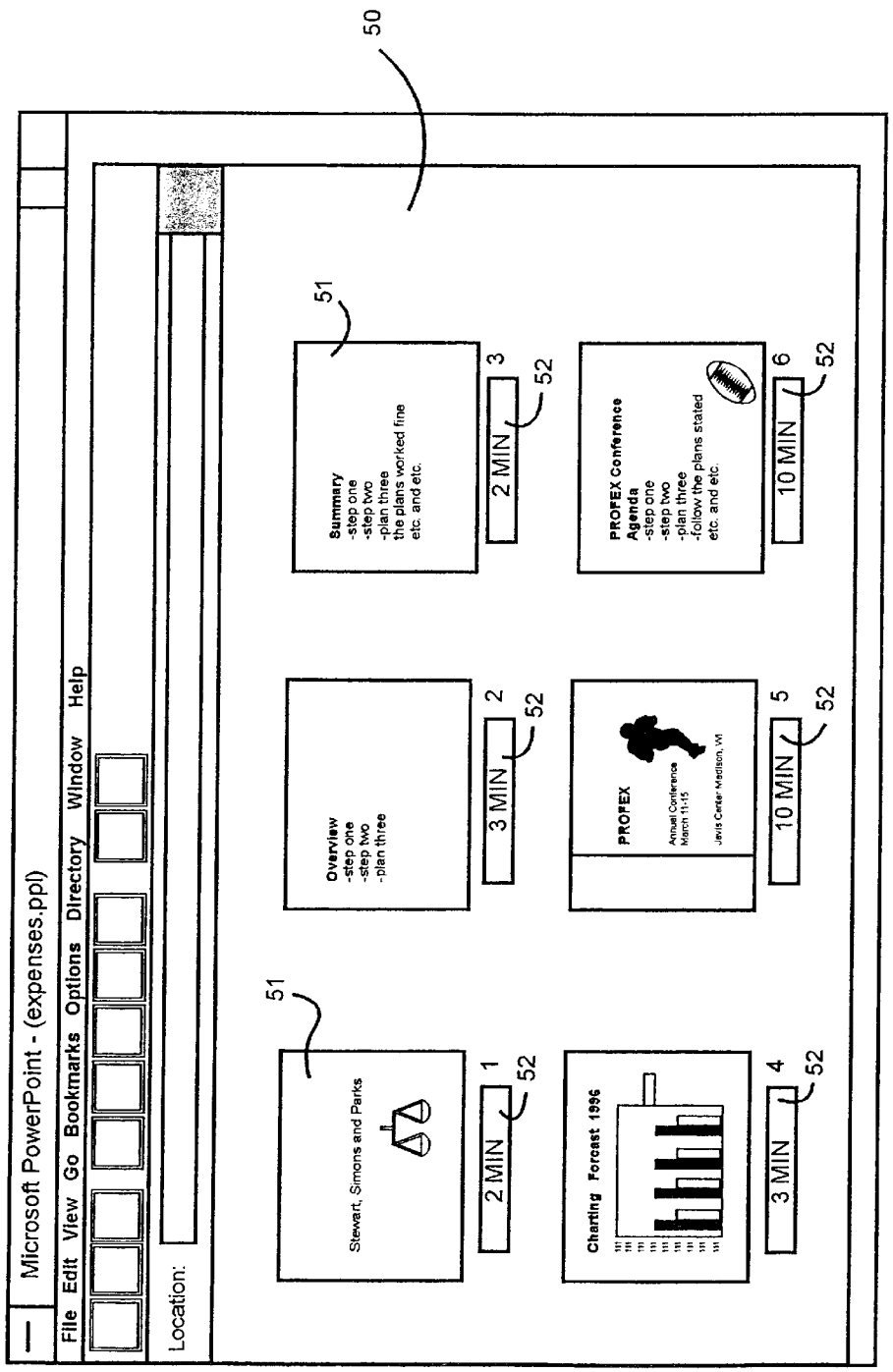
FIG. 3 is the display screen of FIG. 2, wherein the user has entered his designated presentation times for each slide in the sequence.
Figure 4:
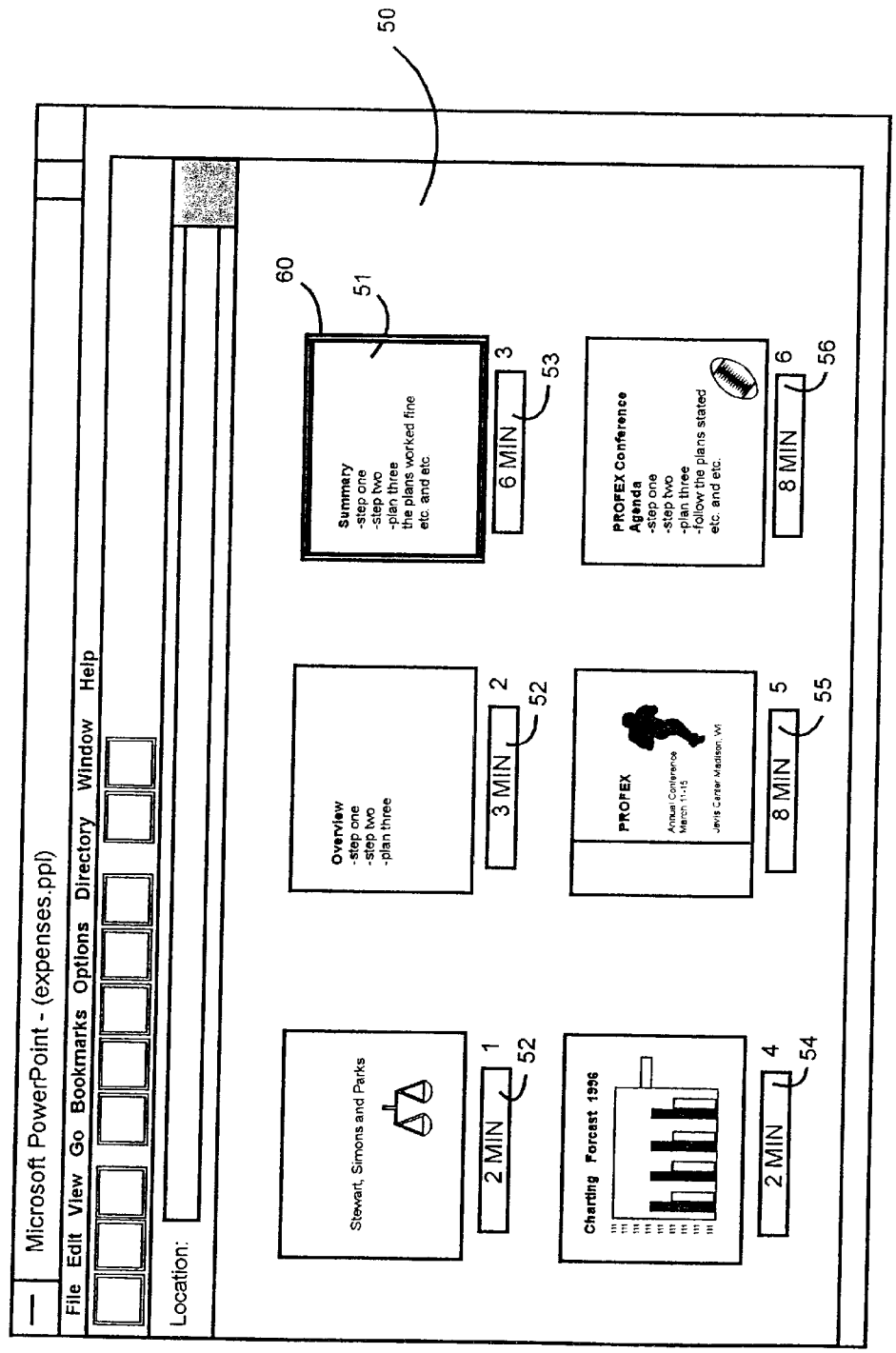
FIG. 4 is the display screen of FIG. 3 after the user has manually overridden the designated time for one of the slides and showing the reapportioned times for the remaining slides after the overridden slide.
Figure 5:
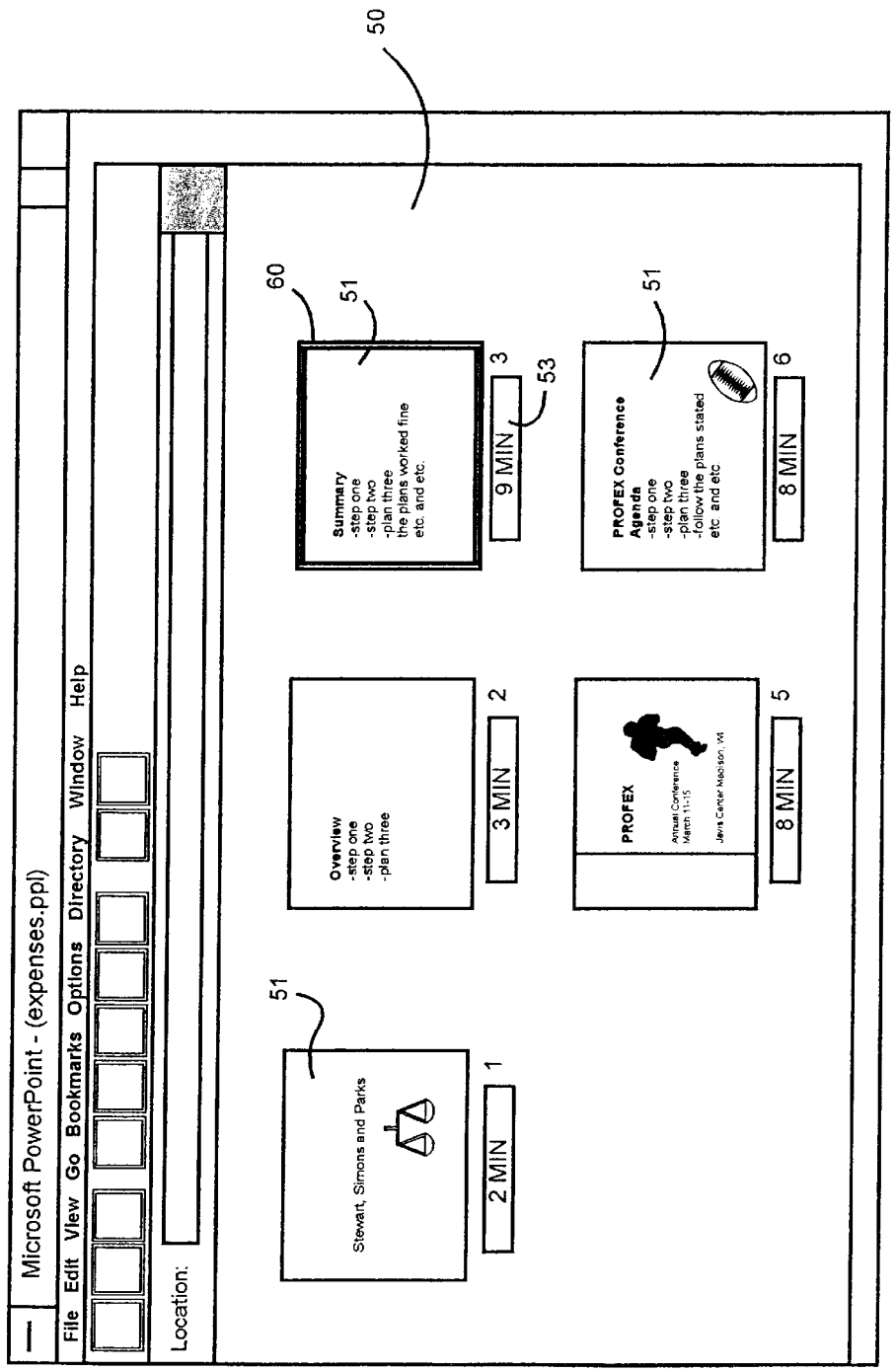
FIG. 5 is the display screen of FIG. 3 after the user has manually overridden the designated time for one of the slides, but with one of the slides eliminated from the presentation, and showing the reapportioned times for the remaining slides.

With reference to FIG. 2, an illustrative data entry display screen is shown. This is the dialog screen offered to users organizing the presentation. On the control display window 50, the user-presenter sets up a sequence of miniature versions 51 of his sequence of slides to be presented, numbered 1 through 6. The setting up of such a sequence of slide miniatures 51 is described in detail in the above-mentioned N. Stevenson et al. text at pp. 321–324. The present invention adds a plurality of dialog boxes 52, each respectively associated with one of the slide miniatures 51. The presenter is prompted to organize the presentation so as to allocate the time for each slide presentation segment by entering the time for the segment in each dialog box 51. The result is shown in FIG. 3 in which the total time for the presentation, 30 minutes, is allocated into segments of 2, 3, 2, 3, 10 and 10 minutes for the sequence of six slides. The presentation may be set up so that the presenter will be alerted when the time for each slide segment has expired so that he may switch to the next slide. Alternatively, the presentation may be set up so that if the presenter does not manually override any of the presentation times, the slide sequence will automatically be switched as the time allocated for the slide segment ends. Now, assume that the presenter, who is currently completing his presentation of slide "3" which is indicated as the current slide by highlighting 60, FIG. 4, has overridden or overrun the designated time of 2 minutes, and has instead used 6 minutes. The process to be hereinafter described with respect to FIGS. 6 through 8 only has 18 minutes of remaining time instead of the original 22 minutes and reduces the time for the remaining three slides to 2, 8 and 8 minutes each as indicated in their respective associated boxes 54, 55 and 56. The user may set up any convenient algorithm for dynamically reallocating the remaining time as the user consumes extra time on any particular presentation slide segment. For example, the algorithm in response to particular time overages may completely eliminate one or more selected slide presentation segments. This is illustrated in the display screen of FIG. 5 where slide segment "4" has been completely eliminated as a result of the user having consumed 9 minutes on the presentation segment of slide "3".

Figure 6:
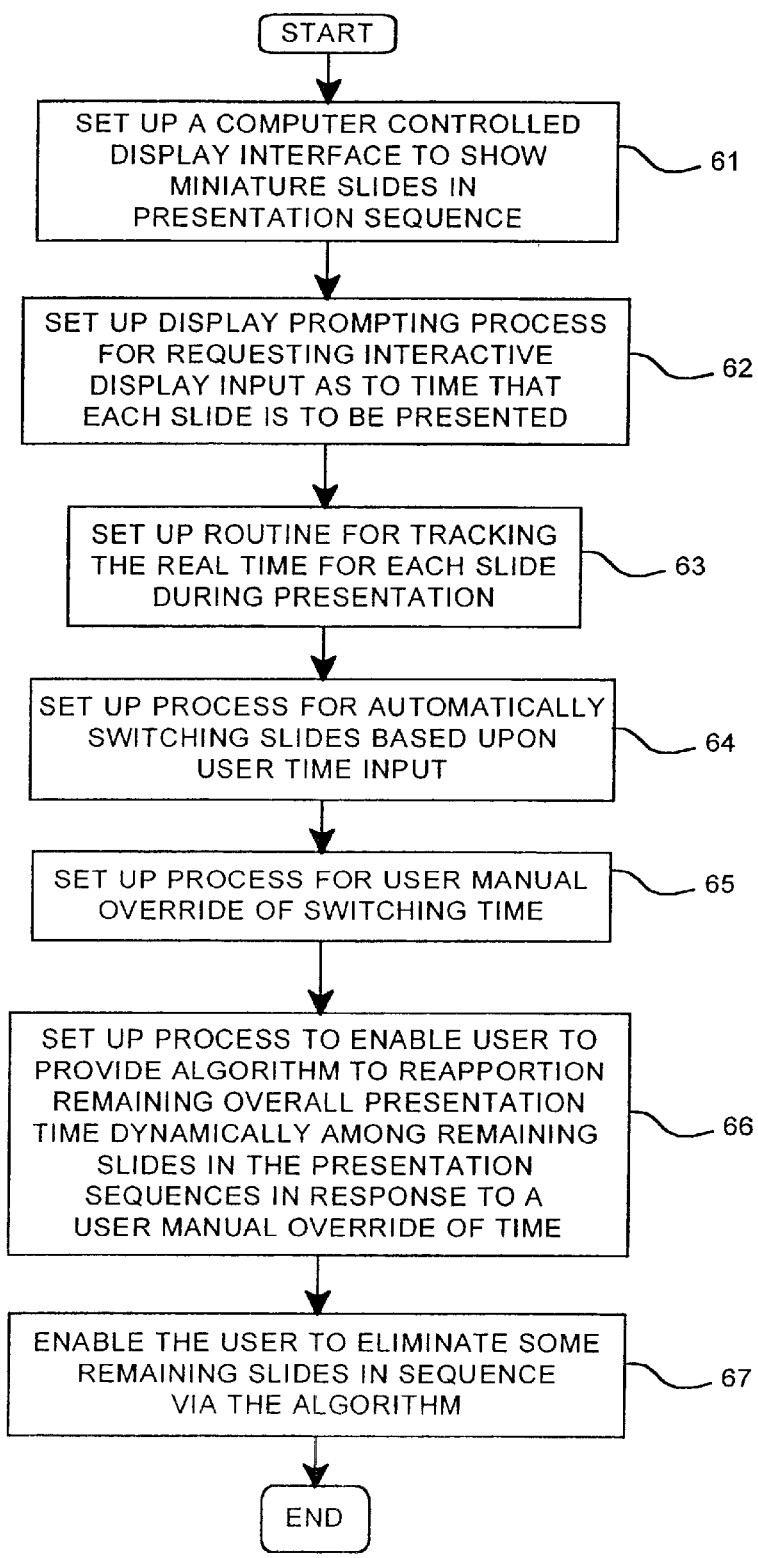
FIG. 6 is a general flowchart of a program set up to implement the present invention of dynamically reapportioning remaining total time among the subsequent sequential presentation segments in response to a change in said time assigned to a sequential segment.

Now, with reference to FIG. 6, we will describe the setting up or development of a program according to the present invention for dynamically reapportioning remaining total time among the subsequent sequential presentation segments in response to a change in said time assigned to a sequential segment in a sequential segmented presentation, which, in this example, will be a slide presentation. First, there is provided a standard program for controlling slide presentations such as PowerPoint 97 which provides an interface for displaying the selected sequence of slides in sequential miniaturized versions, step 61. Then, there is set up a display like that of FIG. 2 wherein the presenter-user is prompted to enter the times during which each sequential slide is to be displayed, step 62. A routine is provided for timing each slide presentation segment, step 63. A process is set up for automatically switching from slide to slide in the sequence based upon the user input times, step 64, or for permitting the presenter to overrun the time for any designated slide segment. A process is provided whereby the user may manually override or overrun the predesignated times for any of the slides in the sequence, step 65. A set up is then provided whereby the presenter is enabled to provide an algorithm for the dynamic reapportionment of remaining overall presentation time among the remaining slides in the presentation sequence in response to a user manual override of the designated time for any slide segment, step 66. This algorithm provision may even include the ability to have the algorithm eliminate one or more remaining slides from the presentation, step 67.

Now that the basic program set up has been described, there will be described with respect to FIG. 7 a flow of a simple operation showing how the program could be run to dynamically control the slide presentation. First, the presenter is prompted for the times for each slide presentation segment, step 70. The time and switch slide sequences are set up accordingly, step 71. The first or next slide is switched to and presented, step 72. For each slide, the end of the time segment is determined, step 73. If No, the flow is returned to step 73 where the time end is awaited. If Yes, then a further determination is made as to whether there has been an override or overrun by the user, step 74. If No, a determination may conveniently be made here as to whether this is the last slide in the presentation, step 78. If Yes, the presentation is ended. If No, then the process is returned to step 72 where the presentation is switched to the next slide. However, if the determination is made in step 74 that Yes, there is an overrun or override, the remaining total time less the extra time of the manual override is computed, step 75, and this remaining time is dynamically reapportioned between the remaining slides in accordance with an appropriate algorithm as set up by the user, step 76. The times are then reset accordingly for the remaining slides, step 77, and the process is returned to step 72 where the presentation is switched to the next slide.

With respect to FIG. 8, there will be described an example of a typical algorithm for time reapportioning.

Algorithm Set Up, Step 81

Tc=Total Presentation Time.

Ta, Tb, Tc, Td, Te and Tf are the user Preset times for each slide.

Tr=Remaining Time

Thus, the algorithm of step 82 is set up with respect to Ta so that if there is an overrun or override and Tr is 20 minutes or more, then Tr, the remaining time is divided by 5, and each of Tb–Tf is dynamically assigned $\frac{1}{5}$ of the remaining time. If Tr is less than 20, then Tb is set at 4 minutes dynamically and each of the other segments is set at Tr minus 4 divided by 4.

There can be a different algorithm equation for each slide segment of the presentation. In step 83, another algorithm equation is set forth; for example, for changes associated with segment Td of the presentation. Thus, if there is an overrun or override at segment Td, then if the remaining Tr is less than 10 minutes, slide segment Te will be dropped from the presentation and the remaining segment Tf will set to the remaining time Tr. Otherwise, the two remaining slide segments are each dynamically allocated half of the remaining time.

One of the preferred implementations of the present invention is in application program 40, i.e. a program made up of programming steps or instructions resident in RAM 14, FIG. 1. Until required by the computer system, the program instructions may be stored in another readable medium, e.g. in disk drive 20 or in a removable memory such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer display system for interactively controlling the timing of a presentation having a plurality of sequential presentation segments comprising:

means for assigning a portion of a total presentation time for each of said plurality of presentation segments;

means for displaying the time assigned to each of said presentation segments;

means enabling an interactive user to change, during the presentation of a segment, the time assigned to the segment being presented, and means responsive to a change in said time assigned to a sequential segment for automatically dynamically reapportioning remaining total time among the subsequent sequential presentation segments.

2. The computer display system of claim 1 further including means for displaying the reapportioned times for said subsequent sequential presentation segments.

3. The computer display system of claim 2 further including means, responsive to said change in said time, for automatically dynamically eliminating one of said sequential segments.

4. The computer display system of claim 1 wherein each of said presentation segments is a presentation of an individual slide.

5. The computer display system of claim 4 further including means for displaying the reapportioned times for said subsequent sequential individual slides.

6. The computer display system of claim 5 wherein said means for displaying the reapportioned times include:

means for displaying a screen including miniaturizations of each of said subsequent sequential individual slides, and means for the displaying the reapportioned time for each slide adjacent to each slide.

7. The computer display system of claim 6 further including means, response to said change in said time, for automatically dynamically eliminating one of said sequential individual slides.

8. A method for interactively controlling the timing of a computer display presentation having a plurality of sequential presentation segments comprising:

assigning a portion of a total presentation time for each of said plurality of presentation segments;

displaying the time assigned to each of said presentation segments;

enabling an interactive user to change, during the presentation of a segment, the time assigned to the segment being presented; and responsive to a change in said time assigned to a sequential segment, automatically dynamically reapportioning remaining total time among the subsequent sequential presentation segments.

9. The method of claim 8 further including the step of displaying the reapportioned times for said subsequent sequential presentation segments.

10. The method of claim 9 further including the step of automatically dynamically eliminating one of said sequential segments response to said change in said time.

11. The method of claim 7 wherein each of said presentation segments is a presentation of an individual slide.

12. The method of claim 11 further including the step of displaying the reapportioned times for said subsequent sequential individual slides.

13. The method of claim 12 wherein said step of displaying the reapportioned times includes:

displaying a screen including miniaturizations of each of said subsequent sequential individual slides; and displaying the reapportioned time for each slide adjacent to each slide.

14. The method of claim 13 further including the step of automatically dynamically eliminating one of said sequential individual slides response to said change in said time.

15. A computer program having code recorded on a computer readable medium for interactively controlling the timing of a computer display presentation having a plurality of sequential presentation segments comprising:

means for assigning a portion of a total presentation time for each of said plurality of presentation segments;

means for displaying the time assigned to each of said presentation segments;

means enabling an interactive user to change, during the presentation of a segment, the time assigned to the segment being presented, and means responsive to a change in said time assigned to a sequential segment for automatically dynamically reapportioning remaining total time among the subsequent sequential presentation segments.

16. The computer program of claim 15 further including means for displaying the reapportioned times for said subsequent sequential presentation segments.

17. The computer program of claim 16 further including means, response to said change in said time, for automatically dynamically eliminating one of said sequential segments.

18. The computer program of claim 15 wherein each of said presentation segments is a presentation of an individual slide.

19. The computer program of claim 18 further including means for displaying the reapportioned times for said subsequent sequential individual slides.

20. The computer program of claim 19 wherein said means for displaying the reapportioned times include:

means for displaying a screen including miniaturizations of each of said subsequent sequential individual slides, and means for the displaying the reapportioned time for each slide adjacent to each slide.

21. The computer program of claim 20 further including means, response to said change in said time, for automatically dynamically eliminating one of said sequential individual slides.

* * * * *